US012148264B2

(12) United States Patent
Higgins et al.

(10) Patent No.: US 12,148,264 B2
(45) Date of Patent: Nov. 19, 2024

(54) MOBILE DEVICE INPUT FOR ELECTRONIC GAMING MACHINES

(71) Applicant: IGT, Las Vegas, NV (US)

(72) Inventors: Kevin Higgins, Reno, NV (US); Erik Petersen, Sparks, NV (US); Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 237 days.

(21) Appl. No.: 17/824,047

(22) Filed: May 25, 2022

(65) Prior Publication Data

US 2023/0386291 A1 Nov. 30, 2023

(51) Int. Cl.
*G07F 17/32* (2006.01)

(52) U.S. Cl.
CPC ...... *G07F 17/3225* (2013.01); *G07F 17/3223* (2013.01)

(58) Field of Classification Search
CPC ......................... G07F 17/3225; G07F 17/3223
See application file for complete search history.

(56) References Cited

U.S. PATENT DOCUMENTS

2016/0093166 A1* 3/2016 Panambur .......... G06Q 20/3278 463/25
2020/0154278 A1* 5/2020 Douglas ................ H04W 12/08
2020/0349571 A1* 11/2020 Patel ...................... G06Q 30/06
2021/0350674 A1* 11/2021 Nelson ................ G07F 17/3239

* cited by examiner

*Primary Examiner* — Werner G Garner
(74) *Attorney, Agent, or Firm* — Sage Patent Group

(57) ABSTRACT

A first transceiver of a gaming device receives a validation request from a mobile device. The gaming device determines that the mobile device is authorized to provide remote input to the gaming device and provides a token to the mobile device. A signal strength threshold for a second transceiver of the gaming device is modified from a first signal strength threshold associated with a first distance between the second transceiver and the mobile device to a second signal strength threshold associated with a second distance greater than the first distance. The second transceiver receives a remote connection request from the mobile device. In response to determining that the remote connection request meets the second signal strength threshold and that the remote connection request comprises the token, the gaming device allows the mobile device to provide remote input instructions to the gaming device.

20 Claims, 10 Drawing Sheets

MOBILE DEVICE INPUT FOR ELECTRONIC GAMING MACHINES

BACKGROUND

Embodiments described herein relate to electronic gaming machines (EGMs), and in particular to providing mobile device input for EGMs, and related systems, devices, and methods. EGMs in a gaming environment, such as a casino environment, typically include components and surfaces that can become unsanitary and contaminated with dirt, oil, bacteria, and other substances over time. Even if the EGM is kept clean and regularly disinfected, players may be discouraged from touching or otherwise interacting with EGMs and other gaming devices in a public or semi-public environment. Accordingly, there is a need for gaming device interfaces that reduce or minimize a player's direct physical interaction with the gaming device.

SUMMARY

According to an embodiment, a gaming device includes a first transceiver, a second transceiver, a processor circuit, and a memory. The memory includes machine-readable instructions that, when executed by the processor circuit, cause the processor circuit to receive, at the first transceiver a validation request from a mobile device. The instructions further cause the processor circuit to determine, based on the validation request, that the mobile device is authorized to provide remote input to the gaming device. The instructions further cause the processor circuit to transmit, by the first transceiver, a token to the mobile device. The instructions further cause the processor circuit to modify a signal strength threshold for the second transceiver from a first signal strength threshold associated with a first distance between the second transceiver and the mobile device to a second signal strength threshold associated with a second distance between the second transceiver and the mobile device, wherein the second distance is greater than the first distance. The instructions further cause the processor circuit to receive, at the second transceiver, a remote connection request from the mobile device. The instructions further cause the processor circuit to determine whether the remote connection request meets the second signal strength threshold. The instructions further cause the processor circuit to determine whether the remote connection request comprises the token. The instructions further cause the processor circuit to, in response to determining that the remote connection request meets the second signal strength threshold and that the remote connection request comprises the token, allow the mobile device to provide remote input instructions to the gaming device.

According to some embodiments, a system includes a processor circuit and a memory. The memory includes machine-readable instructions that, when executed by the processor circuit, cause the processor circuit to determine that a first transceiver associated with a gaming device has received a validation request from a mobile device. The instructions further cause the processor circuit to determine, based on the validation request, that the mobile device is authorized to provide remote input to the gaming device. The instructions further cause the processor circuit to cause the first transceiver to transmit a token to the mobile device. The instructions further cause the processor circuit to modify a signal strength threshold for a second transceiver associated with the gaming device from a first signal strength threshold associated with a first distance between the second transceiver and the mobile device to a second signal strength threshold associated with a second distance between the second transceiver and the mobile device, wherein the second distance is greater than the first distance. The instructions further cause the processor circuit to determine that the second transceiver has received a remote connection request from the mobile device. The instructions further cause the processor circuit to determine whether the remote connection request meets the second signal strength threshold. The instructions further cause the processor circuit to determine whether the remote connection request comprises the token. The instructions further cause the processor circuit to, in response to determining that the remote connection request meets the second signal strength threshold and that the remote connection request comprises the token, cause the gaming device to allow the mobile device to provide remote input instructions to the gaming device.

According to some embodiments, a method includes determining, by a processor circuit, that a first transceiver associated with a gaming device has received a validation request from a mobile device. The method further includes determining, by the processor circuit, based on the validation request, that the mobile device is authorized to provide remote input to the gaming device. The method further includes causing the first transceiver to transmit a token to the mobile device. The method further includes modifying a signal strength threshold for a second transceiver associated with the gaming device from a first signal strength threshold associated with a distance of less than one inch between the second transceiver and the mobile device to a second signal strength threshold associated with a distance of greater than six inches between the second transceiver and the mobile device. The method further includes determining, by the processor circuit, that the second transceiver has received a remote connection request from the mobile device. The method further includes determining, by the processor circuit, whether the remote connection request meets the second signal strength threshold. The method further includes determining, by the processor circuit, whether the remote connection request comprises the token. The method further includes, in response to determining that the remote connection request meets the second signal strength threshold and that the remote connection request comprises the token, causing the gaming device to allow the mobile device to provide remote input instructions to the gaming device.

DETAILED DESCRIPTION

Embodiments described herein relate to electronic gaming machines (EGMs), and in particular to providing mobile device input for EGMs, and related systems, devices, and methods. In some embodiments, a first transceiver of a gaming device receives a validation request from a mobile device. The gaming device determines that the mobile device is authorized to provide remote input to the gaming device and provides a token to the mobile device. A signal strength threshold for a second transceiver of the gaming device is modified from a first signal strength threshold associated with a first distance between the second transceiver and the mobile device to a second signal strength threshold associated with a second distance greater than the first distance. The second transceiver receives a remote connection request from the mobile device. In response to determining that the remote connection request meets the second signal strength threshold and that the remote connection request comprises the token, the gaming device allows the mobile device to provide remote input instructions to the gaming device.

In some embodiments, a mobile device can wirelessly communicate with a gaming device, e.g., such as an electronic gaming machine (EGM), using a short- or medium range wireless protocol, such as Bluetooth, WIFi, etc. In some examples, a radio in the EGM used for other functions, such as player card validation, can be also used for these additional functions. Alternatively, or in addition, a separate connection can be established with this or another radio for this functionality. The mobile device may use a mobile app or other software to employ this functionality. For example, a game publisher may provide a mobile app that can be used with the publisher's games at EGMs hosted by different operators, or the functionality can be integrated into different operator apps. In some examples, existing protocols for player validation, such as Cardless Connect™, can be modified to employ this functionality. For example, many existing protocols currently meet the wireless security requirements of various jurisdictions. In some examples, a Bluetooth Generic Access Profile (GAP) can be updated to advertise and provide different messages specific to providing input instructions to the mobile device from the EGM, to the EGM from the mobile device, and/or between the mobile device, EGM, and/or other devices.

Figure 1:
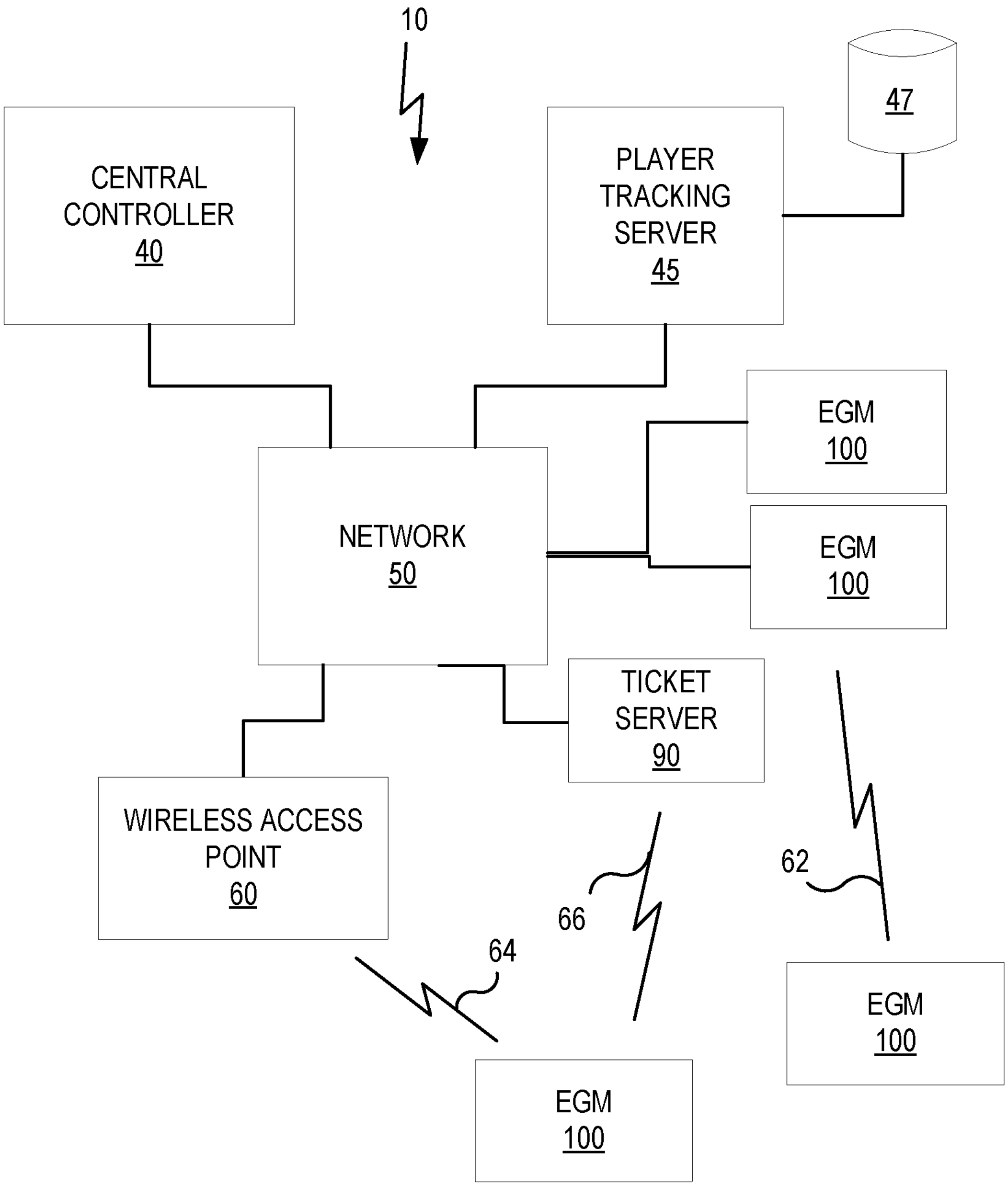
FIG. 1 is a schematic block diagram illustrating a network configuration for a plurality of gaming devices according to some embodiments.

Referring now to FIG. 1, a gaming system 10 including a plurality of gaming devices 100 is illustrated. As discussed above, the gaming devices 100 may be one type of a variety of different types of gaming devices, such as electronic gaming machines (EGMs), kiosks, sports wagering terminals, mobile devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processor circuit and at least one memory or storage device. Each gaming device 100 may include a processor circuit that transmits and receives events, messages, commands or any other suitable data or signal between the gaming device 100 and the central controller 40. The gaming device processor circuit is operable to execute such communicated events, messages or commands in conjunction with the operation of the gaming device 100. Moreover, the processor circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processor circuits. Moreover, in some embodiments, one or more of the functions of one or more gaming device processor circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processor circuit that transmits and receives events, messages, commands or any other suitable data or signal between the ticket server 90 and the central controller 40. The ticket server 90 processor circuit may be operable to execute such communicated events, messages or commands in conjunction with the operation of the ticket server 90. Moreover, in some embodiments, one or more of the functions of one or more ticket server 90 processor circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, an NFC link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
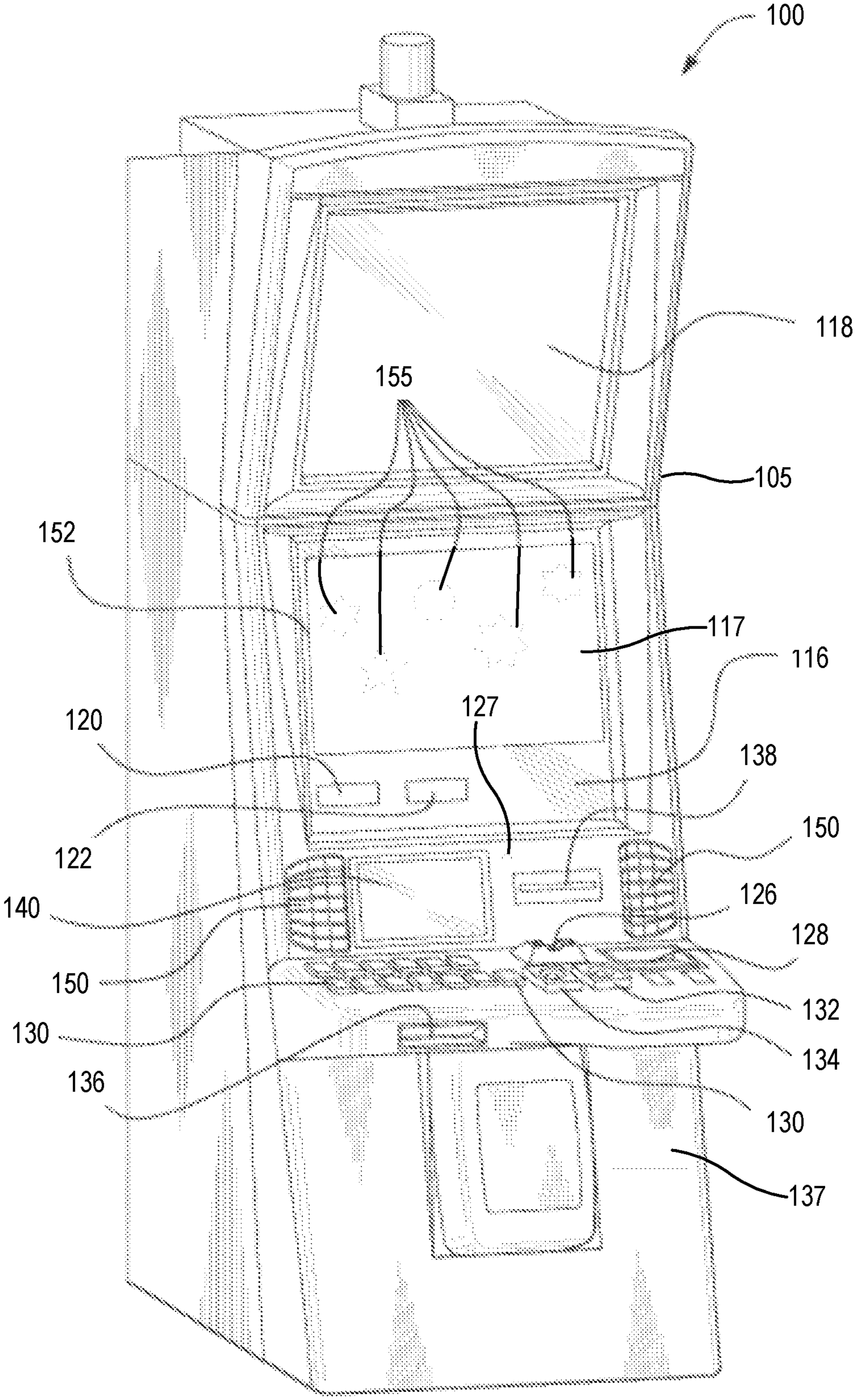
FIGS. 2A to 2E illustrate gaming devices according to various embodiments.
Figure 2B:
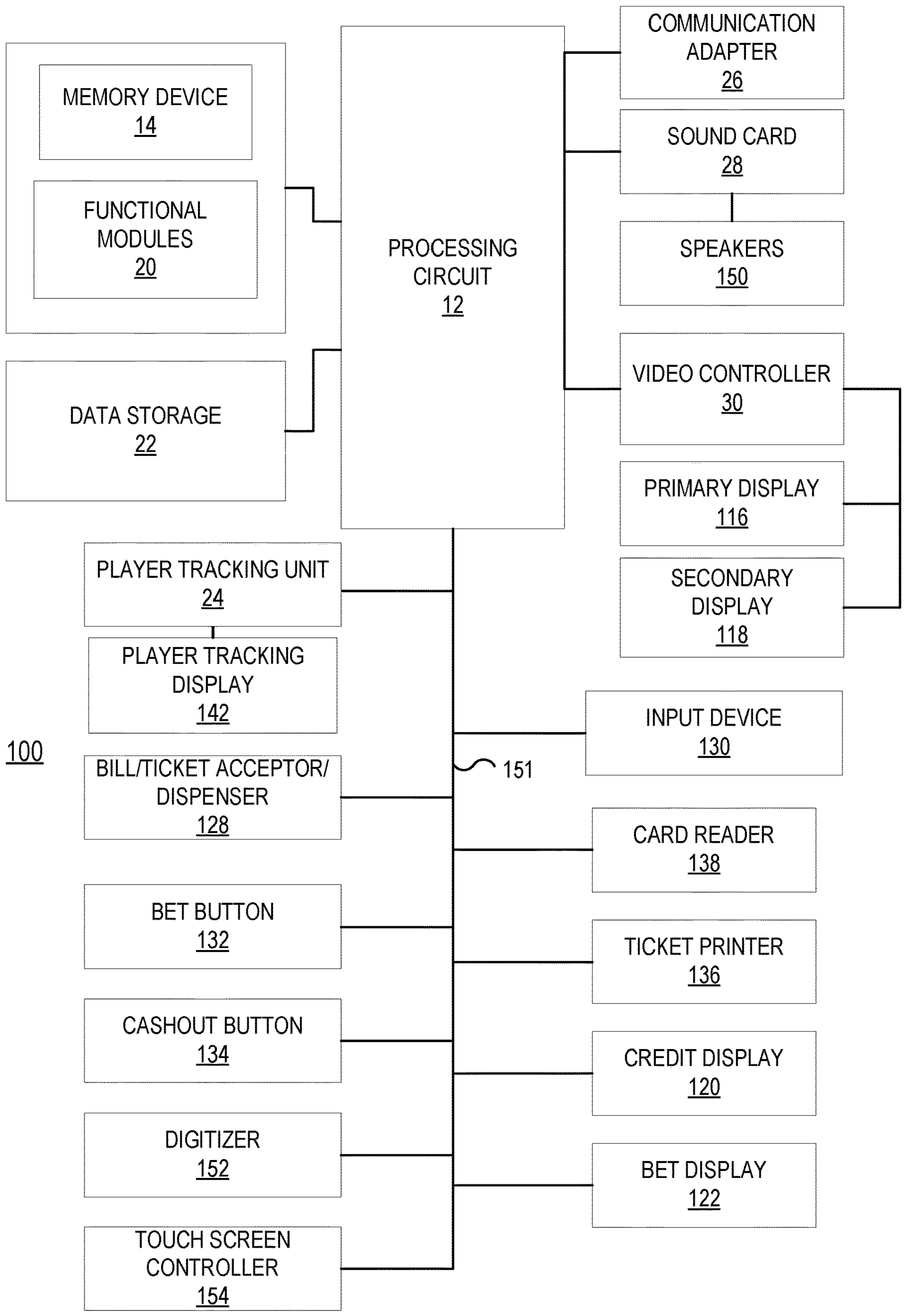
Figure 2C:
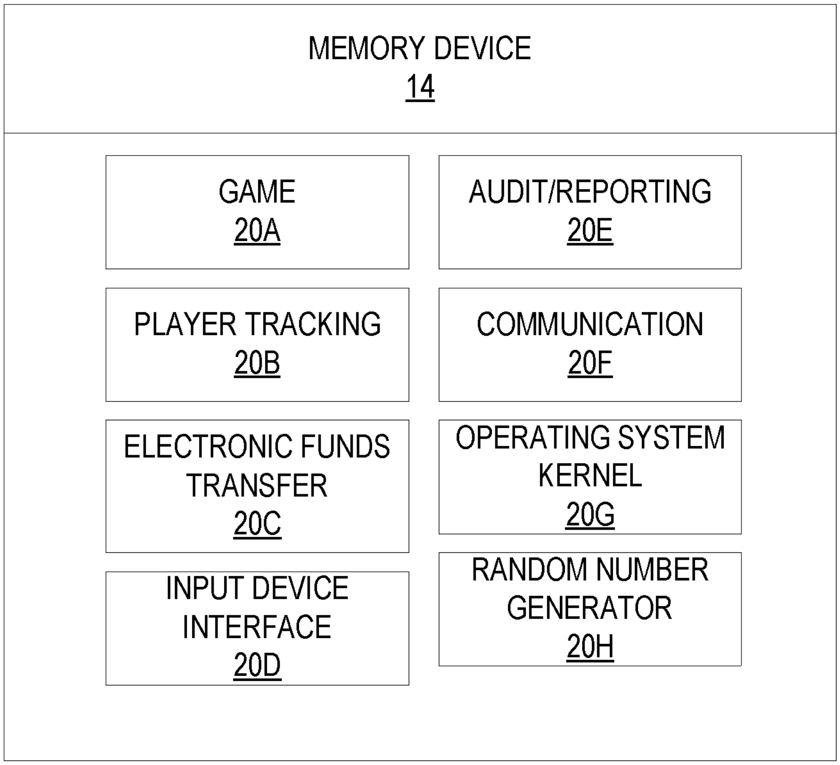

Embodiments herein may include different types of gaming devices. Various embodiments are illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments of the inventive concepts are not limited to the particular gaming device structures described herein.

Gaming devices 100 typically include a number of standard features, many of which are illustrated in FIGS. 2A and 2B. For example, referring to FIG. 2A, a gaming device 100 may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processor circuit 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processor circuit 12. In some embodiments however, the credit display 120 and/or the bet display 122 may be driven by the video controller 30. The gaming device 100 may also include a player tracking unit 24, such as a gaming device interface board or Slot Machine Interface Board (SMIB), for example, for managing communications and functionality between the processor circuit 12 and certain peripherals and components. The player tracking unit 24 may also include a player tracking display 140 separate from the primary display 116 and/or secondary display 118, as desired. Player tracking units 24 may be standardized across machine types to operate interchangeably across a manufacturer's lineup.

Referring again to FIG. 2A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket printer 136, a bill/ticket acceptor/dispenser 128, that allows the player to deposit and/or receive tickets and/or currency into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In this example, the card reader 138 is connected to and controlled by the processing circuit 12, but it should be understood that the card reader 138 and other components may be connected to and controlled by the player tracking unit 24 in some embodiments. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processor circuit 12 that controls operations of the gaming device 100. Although illustrated as a single processor circuit, multiple special purpose and/or general purpose processors and/or processor cores may be provided in the gaming device 100. For example, the gaming device 100 may include one or more of a video processor, a signal processor, a sound processor and/or a communication controller that performs one or more control functions within the gaming device 100. The processor circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processor circuit 12. It will be appreciated that the components may be connected to the processor circuit 12 through a system bus 151, a communication bus and controller, such as a USB controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processor circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the gaming device 100 to communicate, for example, with a mobile communication device operated by a player.

The gaming device 100 may include one or more internal or external communication ports that enable the processor circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor circuit through a universal serial bus (USB) hub (not shown) connected to the processor circuit 12.

In some embodiments, the gaming device 100 may include a sensor, such as a camera 127, in communication with the processor circuit 12 (and possibly controlled by the processor circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processor circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back-end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

Many embodiments described herein employ gaming devices 100 that are land-based EGMs, such as banks of slot machines in a casino environment, but in some embodiments, a gaming device 100 may additionally or alternatively include a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a handheld device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
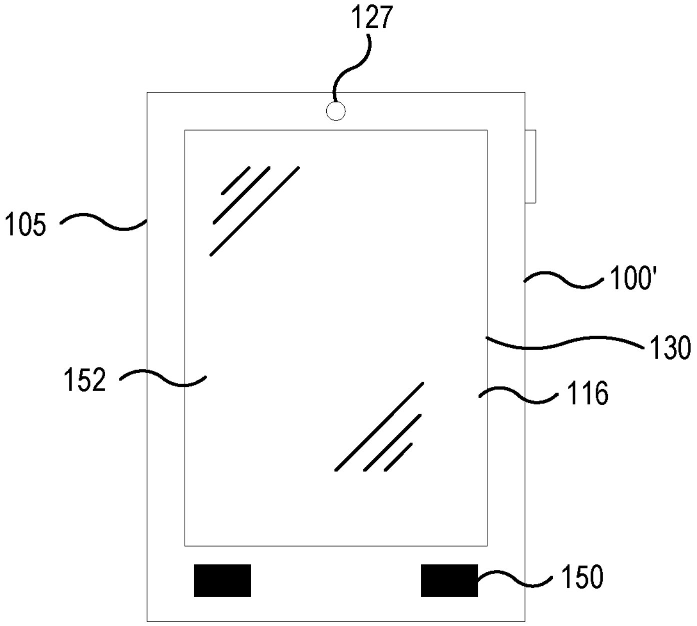

For example, referring to FIG. 2D, a gaming device 100' may be implemented as a handheld device including a compact housing 105 on which is mounted a touchscreen display device 116 including a digitizer 152. One or more input devices 130 may be included for providing functionality of for embodiments described herein. A camera 127 may be provided in a front face of the housing 105. The housing 105 may include one or more speakers 150. In the gaming device 100', various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100' may omit certain features, such as a bill acceptor, a ticket generator, a coin acceptor or dispenser, a card reader, secondary displays, a bet display, a credit display, etc. Credits can be deposited in or transferred from the gaming device 100' electronically.

Figure 2E:
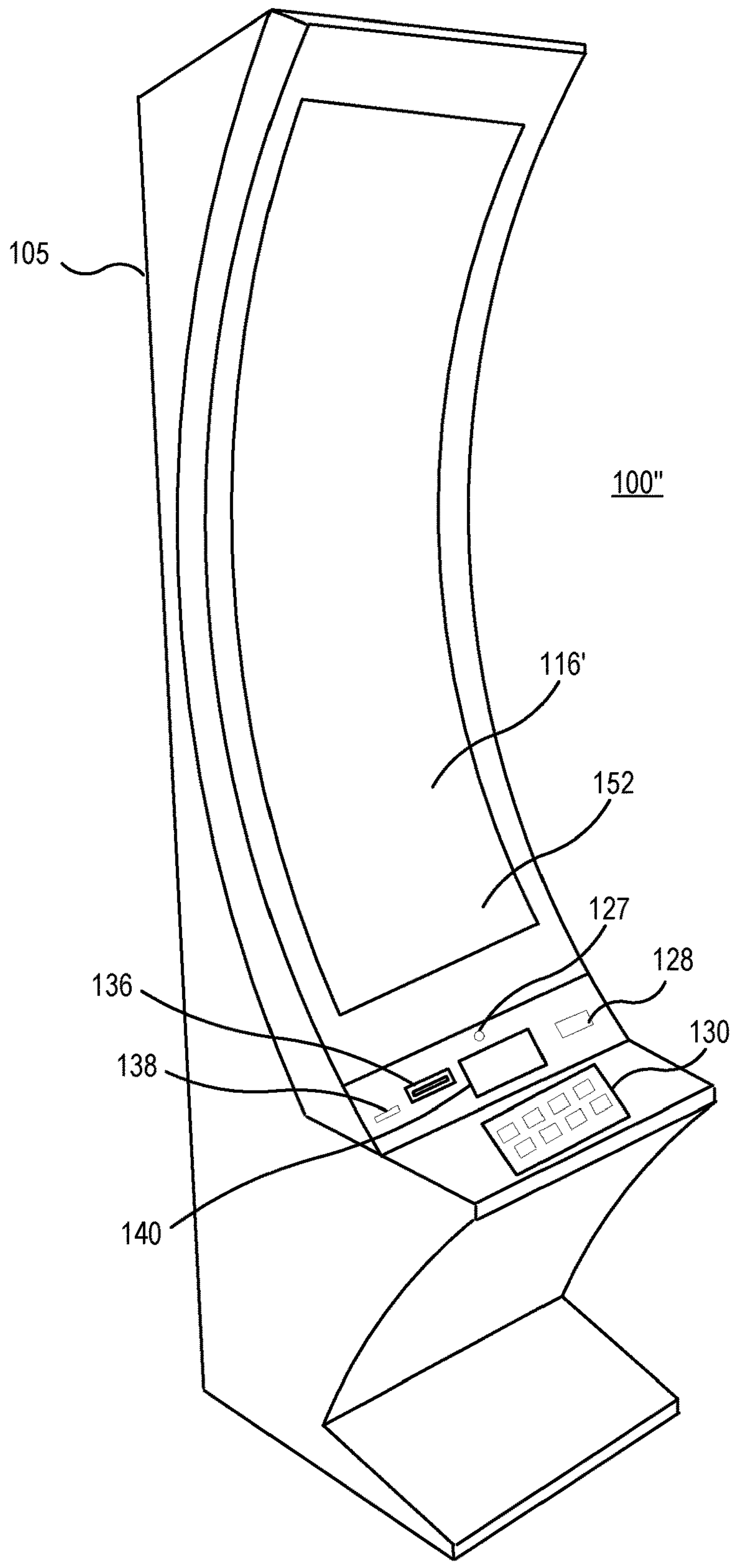

FIG. 2E illustrates a standalone gaming device 100'', i.e., an EGM in this example, having a different form factor from the gaming device 100 illustrated in FIG. 2A. In particular, the gaming device 100'' is characterized by having a large, high aspect ratio, curved primary display device 116' provided in the housing 105, with no secondary display device. The primary display device 116' may include a digitizer 152 to allow touchscreen interaction with the primary display device 116'. The gaming device 100'' may further include a player tracking display 142, an input device 130, a bill/ticket acceptor 128, a card reader 138, and a bill/ticket dispenser 136. The gaming device 100'' may further include one or more cameras 127 to enable facial recognition and/or motion tracking.

Although illustrated as certain gaming devices, such as electronic gaming machines (EGMs) and mobile devices, similar functions and/or operations as described herein may include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 3B:
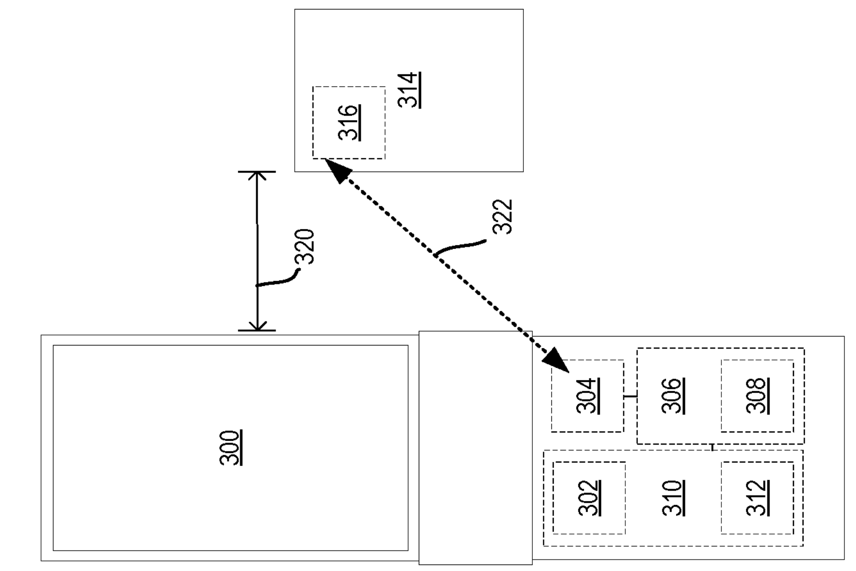
FIGS. 3A and 3B are views of an EGM in a gaming environment, such as a casino floor, communicating with a mobile device to enable mobile input for the EGM, according to some embodiments.
Figure 3A:
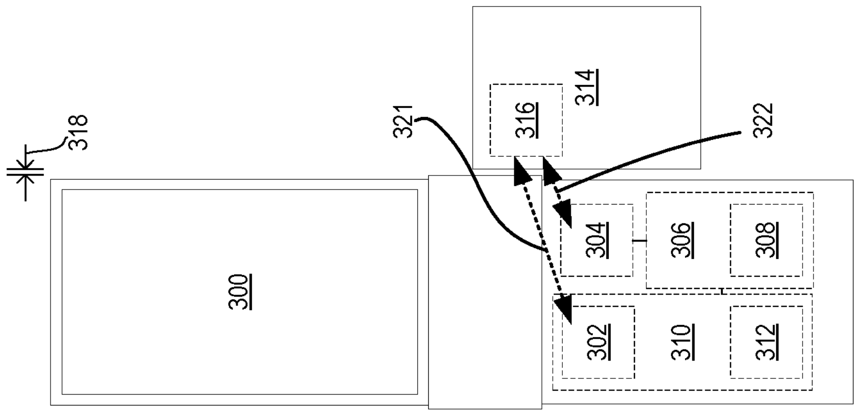

Referring now to FIG. 3, illustrates an EGM 300 in a gaming environment, such as a casino floor, communicating with a mobile device 314 to enable mobile input for the EGM 300, according to some embodiments. In some examples, the EGM 300 may be a gaming device 100, 100"[JD1] as discussed above with respect to FIGS. 2A-2E, and/or the mobile device may be a gaming device 100' as discussed above with respect to FIG. 2D. The EGM 300 in the embodiment of FIGS. 3A and 3B includes an EGM controller 306 that includes an EGM processor 308 for managing and controlling components of the EGM 300, such as input devices, display devices, etc. The EGM 300 also includes a gaming device interface board 310 with its own interface board processor 312 for managing and controlling execution of a wagering game installed on the EGM 300, such as game math, generating game results, etc. In this example the gaming device interface board 310 is a Slot Machine Interface Board (SMIB). The gaming device interface board 310 is connected to and in communication with the EGM controller 306 and may also include an interface board transceiver 302 for communicating with external equipment or other components.

In this example, the interface board transceiver 302 may employ a relatively low power, short range protocol, such as Remote Frequency ID (RFID), Near-Field Communication (NFC), low power Bluetooth, etc. This allows for wireless communication with external devices in close proximity with the EGM 300 while reducing a risk of access by unauthorized devices. For example, as shown in FIG. 3A, the interface board transceiver 302 has a predetermined signal strength threshold corresponding to a first distance 318 of less than one inch, essentially requiring a communicating device to touch or tap the EGM 300 in order to connect and communicate. A mobile device 314 may include a mobile device transceiver 316 for connecting and communicating with the interface board transceiver 302, such as to validate a player ID or account associated with the mobile device 314.

The EGM 300 in this example includes a second transceiver 304 connected to the EGM controller 306, for communicating with external devices, such as receiving remote input instructions and/or providing user interface data to an external device. By default, the second transceiver may have a predetermined signal strength threshold associated with the first distance 318, e.g., less than one inch, similar to the interface board transceiver 302. As with the interface board transceiver 302, the signal strength threshold of the second transceiver 304 is set to allow for wireless communication with external devices in close proximity with the EGM 300 while reducing a risk of access by unauthorized devices.

One reason for separating certain functions of the EGM 300 between the EGM controller 306 and the gaming device interface board 310 is because different functions of the EGM 300 may be handled by different entities, with different internal and external security protocols. For example, the gaming device interface board 310 may be provided by a single vendor for all EGMs 300 in a casino as a component of a casino management system used by the casino. By using a common gaming device interface board 310 across EGMs 300 provided by different manufacturers, the casino can provide a common player tracking experience across EGMs 300 in the casino. As noted above, the gaming device interface board 310 may also manage verification of a player account associated with the game provider (as distinct from a separate player account with the game operator).

Meanwhile, the control of the EGM 300 itself may have different security protocols and priorities. Thus, while the default short range signal strength threshold for the second transceiver 304 may allow for a mobile device 314 in close proximity, e.g., touching or tapping the EGM 300, to communicate with the EGM 300, it may be desirable to allow for longer range communication between the EGM 300 to allow a player to hold the mobile device at a more comfortable second distance 320 (e.g., greater than six inches, see FIG. 3B) to control certain functions of the EGM 300, such as providing game play input for example.

In this example, the mobile device 314 may be validated by the gaming device interface board 310 using an interface board wireless connection 321 at the shorter first distance 318 between the interface board transceiver 302 of the gaming device interface board 310 and the mobile device transceiver 316 of the mobile device 314. This ensures that the mobile device 314 is physically present and in close contact with the EGM 300. A validation request is received at the interface board transceiver 302 from the mobile device 314 and the gaming device interface board 310 determines, based on the validation request, that the mobile device 314 is authorized, e.g., associated with a particular player, player account, player ID, etc. In this example, the gaming device interface board 310 may also determine, based on the validation request, that the mobile device 314 is authorized to provide remote input to the EGM 300. Based on this determination, a token is transmitted to the mobile device 314 by the interface board transceiver 302, and a signal strength threshold for the second transceiver 304 is modified from a first signal strength threshold associated with the first distance 318 to a second signal strength threshold associated with the larger second distance 320.

In some embodiments, additional communication operations between the gaming device interface board 310 and the EGM 300 may also be used to validate the token. For example, in some embodiments, the token may be transmitted from the gaming device interface board 310 to the EGM 300, which may authorize that the EGM 300 to reduce the signal strength threshold for a period of time.

The mobile device 314 next transmits a remote connection request including the token to the second transceiver 304. The EGM controller 306 determines whether the remote connection request includes the token and meets the second signal strength threshold. In response to determining that the remote connection request meets the second signal strength threshold and that the remote connection request comprises the token, the EGM controller 306 allows the mobile device 314 to provide remote input instructions to the gaming device over a remote connection 322 at the second distance 320. If the EGM controller 306 determines either that the remote connection request does not meet the second signal strength threshold or that the remote connection request does not comprise the token, the EGM controller 306 may disallow the mobile device 314 from providing remote input instructions to the EGM 300. In some examples, the EGM controller 306 may allow the mobile device to provide remote input instructions to the EGM 300 without the token, for example, in response to a determination that the remote connection request meets the first signal strength threshold, e.g., that the mobile device 314 is within the shorter first distance 318.

In some embodiments, before reducing the signal strength threshold, the EGM 300 may pass the token to the gaming device interface board 310 to validate the token. The gaming device interface board 310 validates the token and informs the EGM 300, which would then allow the EGM 300 to reduce the signal strength threshold. If the gaming device interface board 310 is unable to validate the token, the EGM 300 would reject the connection request. In another example, the gaming device 310 and EGM 300 may share a cryptographic key, with the tokens generated by the gaming device interface board 310 signed by the cryptographic key. The EGM 300 could then use the cryptographic key to validate the token independently of the gaming device interface board 310.

Figure 4A:
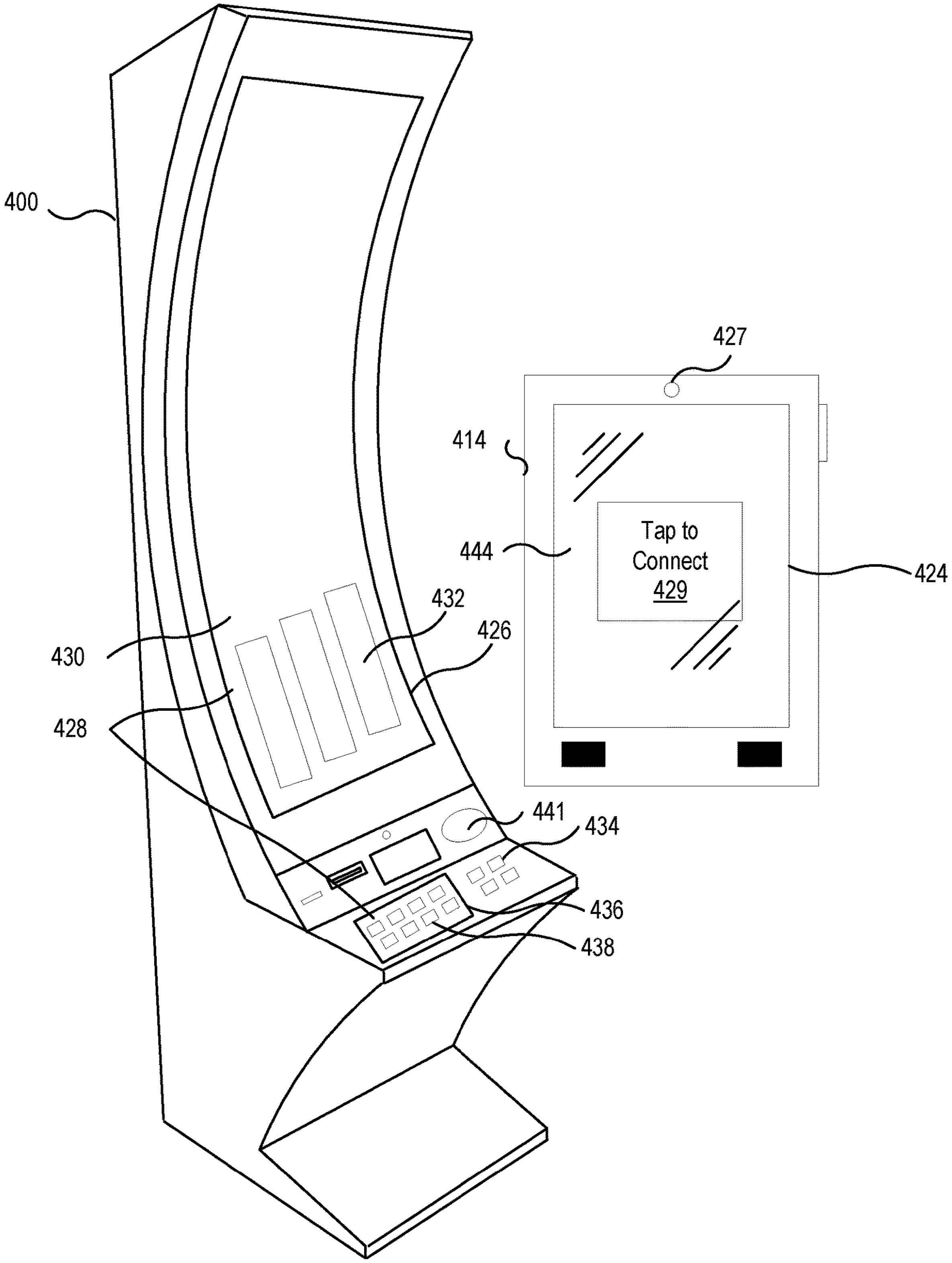
FIGS. 4A and 4B are views of an EGM graphical user interface (GUI) for an EGM and a mobile GUI for a mobile device in communication with and providing input for the EGM, according to some embodiments.
Figure 4B:
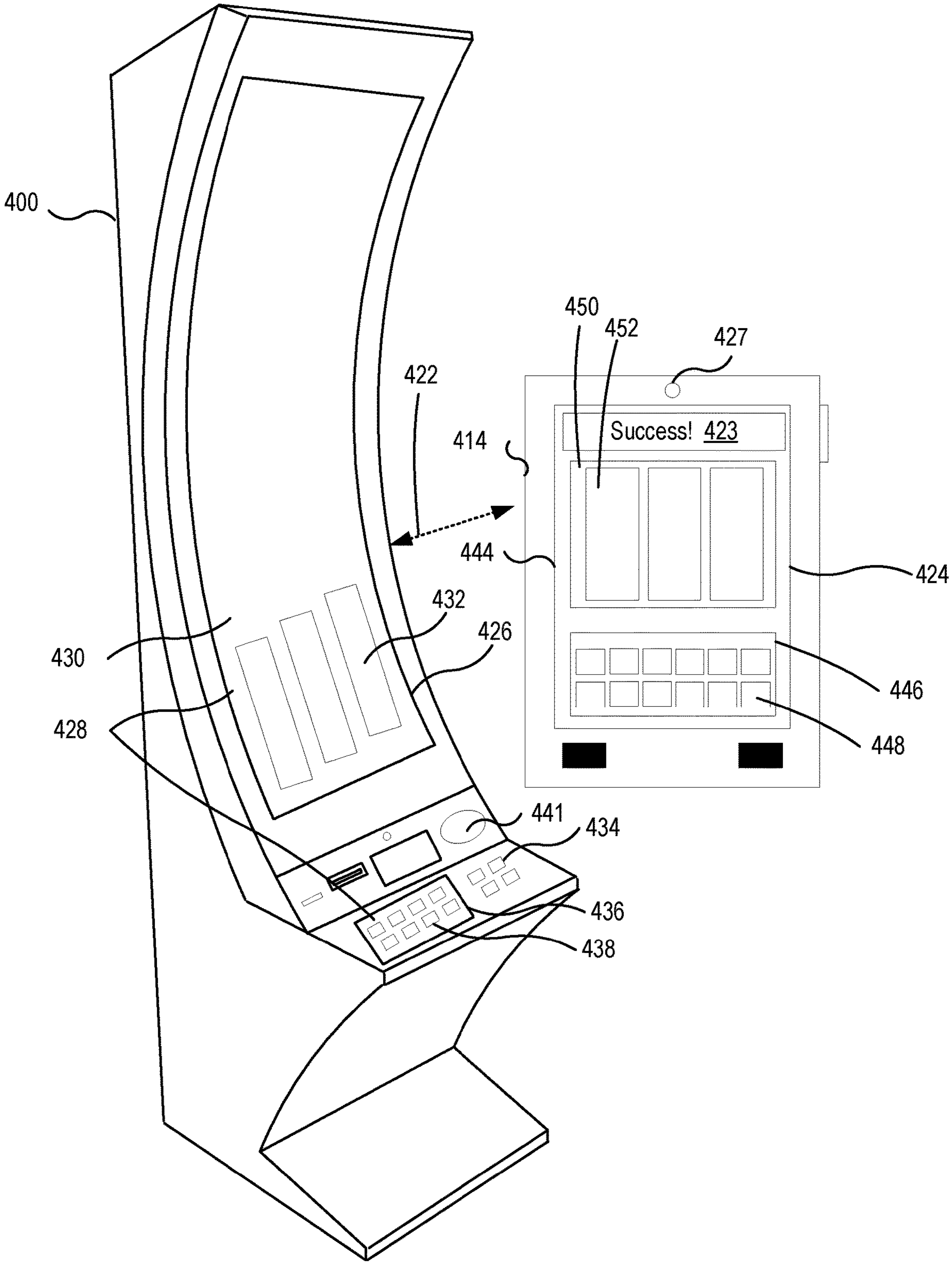

FIGS. 4A and 4B are views of an EGM graphical user interface (GUI) 428 for an EGM 400 and a mobile GUI 444 for a mobile device 414 in communication with and providing input for the EGM 400, according to some embodiments. In this example, the EGM GUI 428 is displayed on a primary EGM display 426 and a touchscreen EGM display 436, and the mobile GUI 444 is displayed on a touchscreen mobile display of the mobile device 414.

During an authorization process, as shown in FIG. 4A, the EGM GUI 428 displays a message 429 to tap the mobile device 414 to a scanning area 441, which is proximate to a transceiver antenna for communicating with a transceiver of the EGM 400, such as the first transceiver 302 of gaming device interface board 310 of FIGS. 3A and 3B for example.

In some examples, an operator's app on the mobile device 414 may determine whether a remote control feature is available for the game, such as by scanning for the feature being advertised by a particular EGM 400, e.g., via a BLE feature of the EGM 400. Based on the determination, the operator's app can enable or disable a button in the mobile GUI 444 to call up the mobile button panel in the operator's app and/or switch to a different app, e.g., provided by the game provider. In some examples, the feature advertisement may include an identifier for the EGM 400 to aid in validating the EGM 400.

In response to the mobile device 414 being brought within range, e.g., tapped or touched, the mobile device 414 communicated with the EGM 400 to validate the mobile device 414. The EGM 400 provides a token, e.g., a nonce or other type of encoded message or file, indicating that the high signal strength requirement can be safely disabled for the specific mobile device 414. The token may have a limited validity time, e.g., 10 seconds, to allow the mobile device 414 sufficient time to establish a remote connection. In some examples, the token can be passed between apps (e.g., an operator's app and a game provider's app) to enable another app to use the token to establish a remote connection.

As shown by FIG. 4B, in response to the authorization process being successful, the mobile device GUI 444 and/or the EGM GUI 428 may display a message 423 indicating that the authorization was successful and that a remote connection 422 has been established, e.g., between the mobile device 414 and the EGM 400 (e.g., via the second transceiver 304 of FIGS. 3A and 3B). The remote connection 422 enables the mobile device 414 to provide remote input instructions including game play instructions to the EGM 400. The remote input instructions are generated by the mobile device, e.g., via the touchscreen mobile display 424, which displays a mobile input panel 446 including a plurality of displayed mobile inputs 448 and/or physical input components of the mobile device 414. The mobile input panel 446 may correspond to a layout of input devices 434 and/or touchscreen EGM inputs 438 of the EGM 400, in order to replicate the look and feel of the EGM input panel. In some examples, the EGM 400 may disable the touchscreen EGM inputs 438 and/or the EGM input devices 434 corresponding in response to displaying the mobile input panel 446 on the display device of the mobile device 414, to avoid player confusion, duplicate inputs, etc.

In some embodiments, the mobile GUI 444 may also include a game board 450 and game elements 452 that may also correspond to the game board 430 and game elements 432 displayed on the primary EGM display 426, for example. As with the display of the mobile input panel 446, the display of other elements of the mobile GUI 444 may cause the EGM 400 to disable corresponding EGM GUI 428 as well.

In some examples, establishing the remote connection 422 may cause the EGM 400 to transmit mobile GUI 444 elements corresponding to EGM GUI 428 elements from the EGM 400 to the mobile device 414 for display on the mobile display 424. For example, customized graphics for a particular game can be stored on the EGM 400 and transmitted to the mobile device 414 on an as-needed basis. In some embodiments, the mobile device 414 can download customized graphics from another device, such as a network server or via the Internet, for example. In some examples, the graphical interface elements, e.g., mobile inputs 448, game elements 452, etc., may include dynamic and/or animated interface elements, to further enhance the gameplay experience for the player. In some examples, the provision of dynamic and/or animated interface elements may be controlled based on an available bandwidth. For example, if an EGM radio and/or mobile device uses a low-bandwidth protocol, such as Bluetooth Low Energy (BLE), and/or has limited processing power or available memory, the number, complexity, and/or frequency of dynamic elements may be controlled based on bandwidth or other limitations.

Figure 5B:
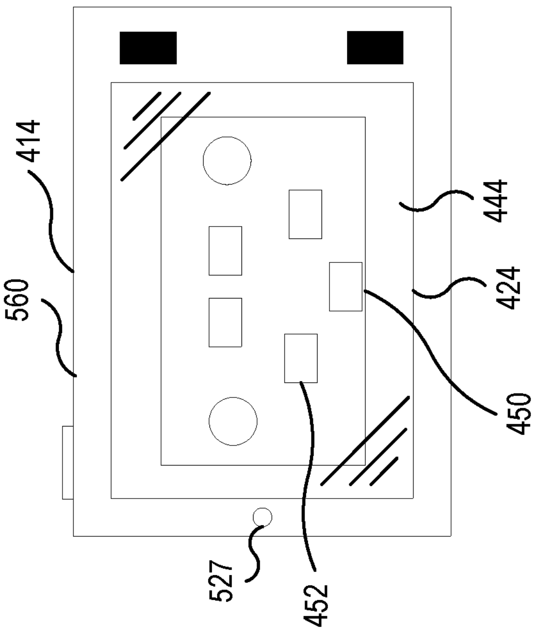
FIGS. 5A and 5B are views of a mobile device GUI providing views of a game board and an input panel for an EGM based on an orientation of the mobile device, according to some embodiments.
Figure 5A:
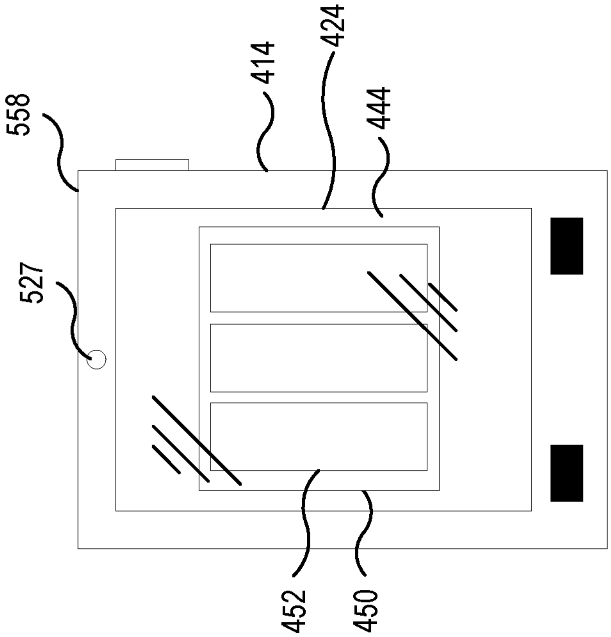

In some examples, a mobile GUI 444 may change based on a state of the mobile device 414, such as an orientation of the mobile device 414. For example, as shown by FIGS. 5A and 5B, the mobile device 414 may determine whether the mobile device 414 is in a portrait orientation 558, i.e., with a greater height than width, or a landscape orientation 560, i.e., with a greater width than height. The mobile device 414 may determine the orientation of the mobile device 414 in a number of ways, such as, for example, an accelerometer sensor, determining an orientation of a user's head using the front-facing camera 527, etc. In this example, the mobile GUI 444 may display the game board 450 and game elements 452 in response to determining that the mobile device 414 is in a portrait orientation 558, as shown in FIG. 5A. In this example, the portrait orientation 558 of the game board 450 generally corresponds to the portrait-style layout of the EGM game board 430 of the EGM GUI 428 (see FIGS. 4A-4B). As shown in FIG. 5B, in response to determining that the mobile device 414 is in a landscape orientation 560, the mobile GUI 444 may display the mobile input panel 446 and mobile inputs 448. In this example, the landscape orientation 560 of the mobile input panel 446 generally corresponds to the landscape-style layout of the EGM touchscreen 438, touchscreen EGM inputs 438, and/or the EGM input devices 434 of the EGM 400 and EGM GUI 428 (see FIGS. 4A-4B).

This arrangement allows for the mobile device 414, which may have a relatively small mobile display 424, to utilize more screen space for each portion of the mobile GUI 444, which can aid in readability and usability, while allowing a user to easily and intuitively switch back and forth between the two orientations 558, 560.

In some examples, a remote connection can be established with multiple EGMs and/or multiple mobile devices simultaneously. For example, a mobile device may display multiple button panels for the multiple EGMs and/or may allow for switching between EGMs, e.g., by selecting a tab or swiping on the mobile device touchscreen. In some examples, button presses and/or sequences can be customized, such as allowing for a slam input, a button combo, and/or automating button presses based on game activity.

Figure 6:
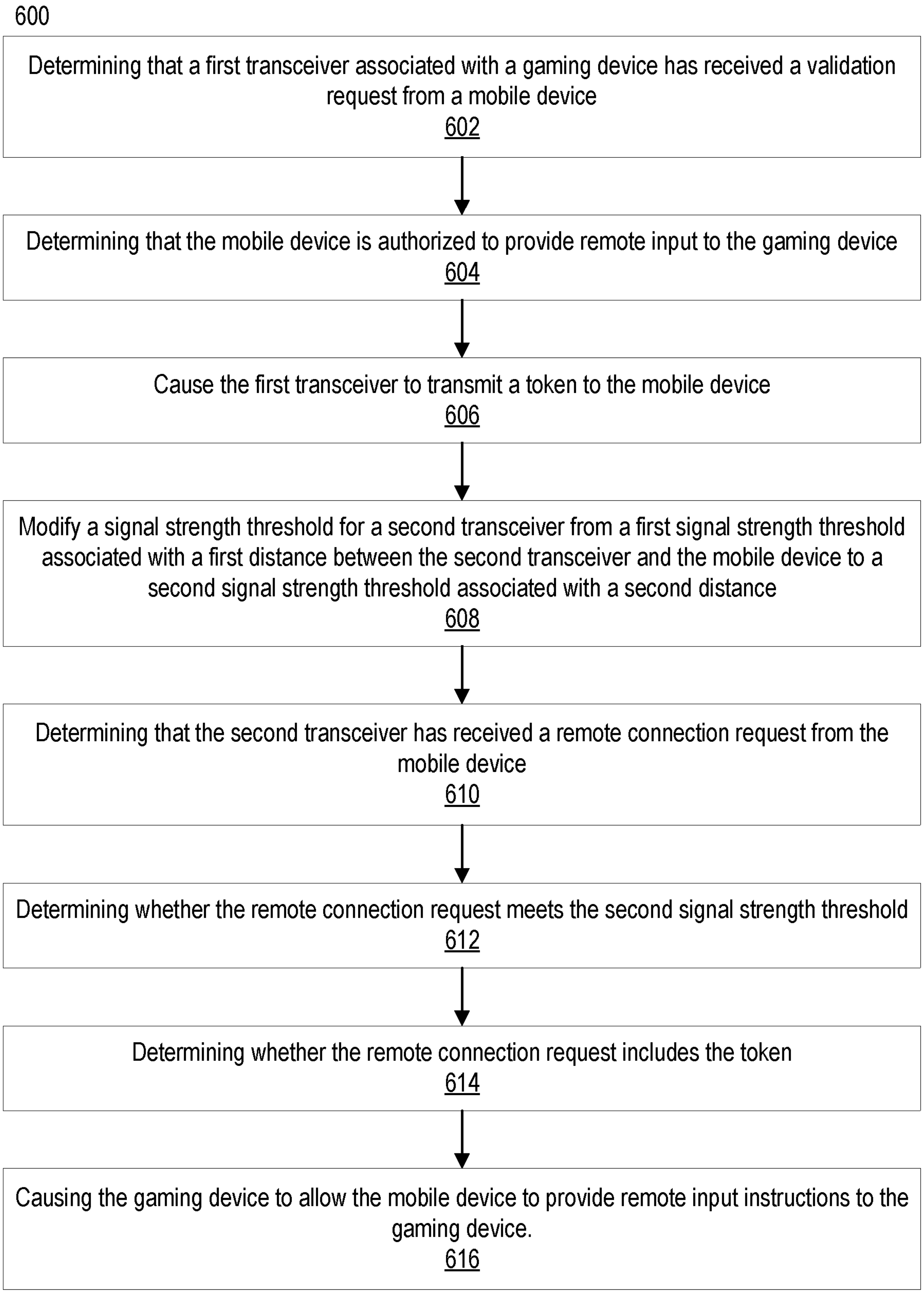
FIG. 6 is a flowchart illustrating operations of systems/methods according to some embodiments.

FIG. 6 is a flowchart illustrating operations 600 of systems/methods according to some embodiments. The operations 600 include determining, by a processor circuit, that a first transceiver associated with a gaming device has received a validation request from a mobile device (Block 602). For example, the first transceiver may include the interface board transceiver 302 of the gaming device interface board 310, discussed above with respect to FIGS. 3A and 3B, which may validate a request by a mobile device 314 to establish a remote connection 322 with an EGM 300.

The operations 600 may further include determining, by the processor circuit, based on the validation request, that the mobile device is authorized to provide remote input to the gaming device (Block 604). The operations 600 may further include causing the first transceiver to transmit a token to the mobile device (Block 606). As discussed above with respect to FIGS. 4A and 4B, a token, e.g., a nonce or other type of encoded message or file, may indicate that the high signal strength requirement for an EGM 400 can be safely disabled for the specific mobile device 414 to allow a remote connection 422 for remote control of the EGM 400 game features.

The operations 600 may further include modifying a signal strength threshold for a second transceiver associated with the gaming device from a first signal strength threshold associated with a first distance between the second transceiver and the mobile device to a second signal strength threshold associated with a second distance (Block 608). In this example, the second distance, e.g., greater than six inches, is greater than the first distance, e.g., less than one inch. In the example of FIGS. 4A and 4B, for example, the high signal strength requirement of the EGM 400 may require a touch or tap between the mobile device 414 and the EGM 400 to put the respective transceivers within range of each other. Based on the validation, however, this signal strength threshold is relaxed to allow for greater distances, e.g., six inches or more, which may be more comfortable and ergonomic for a player.

The operations 600 may further include determining, by the processor circuit, that the second transceiver has received a remote connection request from the mobile device (Block 610). The operations 600 may further include determining, by the processor circuit, whether the remote connection request meets the second signal strength threshold (Block 612, and whether the remote connection request comprises the token (Block 614). For example, as shown in FIGS. 3A and 3B, the EGM 300 determines whether the mobile device 314 is within the second distance and includes the token (discussed in greater detail with respect to FIGS. 4A and 4B). As discussed above with respect to FIGS. 3A and 3B as well, validation of the token may be performed by the EGM 300, the gaming device interface board 310, either independently or in communication with each other. f The operations 600 may further include, in response to determining that the remote connection request meets the second signal strength threshold and that the remote connection request comprises the token, causing the gaming device to allow the mobile device to provide remote input instructions to the gaming device (Block 616). As shown in FIG. 4B, for example, in response to a successful validation of the mobile device 414, the EGM 400 establishes a remote connection 422 between the EGM 400 and the mobile device 414 to enable the mobile device 414 to provide remote gameplay input to the EGM 400.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A gaming device comprising:

a first transceiver;

a second transceiver;

a processor circuit; and a memory comprising machine-readable instructions that, when executed by the processor circuit, cause the processor circuit to:

receive, at the first transceiver, a validation request from a mobile device;

determine, based on the validation request, that the mobile device is authorized to provide remote input to the gaming device;

transmit, by the first transceiver, a token to the mobile device;

modify a signal strength threshold for the second transceiver from a first signal strength threshold associated with a first distance between the second transceiver and the mobile device to a second signal strength threshold associated with a second distance between the second transceiver and the mobile device, wherein the second distance is greater than the first distance;

receive, at the second transceiver, a remote connection request from the mobile device;

determine whether the remote connection request meets the second signal strength threshold;

determine whether the remote connection request comprises the token; and in response to determining that the remote connection request meets the second signal strength threshold and that the remote connection request comprises the token, allow the mobile device to provide remote input instructions to the gaming device.

2. The gaming device of claim 1, wherein the second distance between the mobile device and the second transceiver is greater than six inches.

3. The gaming device of claim 1, wherein the first distance between the mobile device and the second transceiver is less than one inch.

4. The gaming device of claim 1, wherein the machine-readable instructions of the memory further cause the processor circuit to, in response to determining that the remote connection request does not meet the second signal strength threshold, disallow the mobile device from providing the remote input instructions to the gaming device.

5. The gaming device of claim 1, wherein the machine-readable instructions of the memory further cause the processor circuit to, in response to determining that the remote connection request does not comprise the token, disallow the mobile device from providing the remote input instructions to the gaming device.

6. The gaming device of claim 1, wherein the machine-readable instructions of the memory further cause the processor circuit to, in response to determining that the remote connection request meets the first signal strength threshold, allow the mobile device to provide the remote input instructions to the gaming device.

7. The gaming device of claim 1, wherein the processor circuit comprises a first processor circuit and a second processor circuit, the gaming device further comprising a gaming device interface board comprising the first processor circuit and the first transceiver.

8. The gaming device of claim 7, wherein the machine-readable instructions of the memory further cause the second processor circuit to provide a game play instruction to the first processor circuit in response to receiving a remote input instruction from the mobile device, and wherein the machine-readable instructions of the memory further cause the first processor circuit to generate a game result in response to receiving the game play instruction from the second processor circuit.

9. The gaming device of claim 1, wherein the machine-readable instructions of the memory further cause the processor circuit to cause the mobile device to display a graphical input panel on a display device of the mobile device.

10. The gaming device of claim 9, further comprising an input device corresponding to the graphical input panel displayed on the display device of the mobile device, wherein the machine-readable instructions of the memory further cause the processor circuit to disable the input device in response to displaying the graphical input panel on the display device of the mobile device.

11. The gaming device of claim 9, wherein the machine-readable instructions of the memory further cause the processor circuit to disable a graphical input panel of the gaming device corresponding to the graphical input panel displayed on the display device of the mobile device.

12. The gaming device of claim 9, wherein the machine-readable instructions of the memory further cause the processor circuit to, in response to determining that the remote connection request meets the second signal strength threshold and that the remote connection request comprises the token, transmit instructions to the mobile device to display a game board comprising game play elements on a display device of the mobile device.

13. The gaming device of claim 12, wherein the machine-readable instructions of the memory further cause the processor circuit to disable a graphical game board of the gaming device corresponding to the graphical game board displayed on the display device of the mobile device.

14. The gaming device of claim 13, wherein the machine-readable instructions of the memory further cause the mobile device to display the graphical input panel in response to a determination by the mobile device that the mobile device is in a landscape orientation, and wherein the machine-readable instructions of the memory further cause the mobile device to display the graphical game board in response to a determination by the mobile device that the mobile device is in a portrait orientation.

15. The gaming device of claim 9, wherein the machine-readable instructions of the memory further cause the processor circuit to transmit graphical interface elements corresponding to the graphical input panel to the mobile device.

16. The gaming device of claim 15, wherein the graphical interface elements comprise animated interface elements.

17. A system comprising:

a processor circuit; and a memory comprising machine-readable instructions that, when executed by the processor circuit, cause the processor circuit to:

determine that a first transceiver associated with a gaming device has received a validation request from a mobile device;

determine, based on the validation request, that the mobile device is authorized to provide remote input to the gaming device;

cause the first transceiver to transmit a token to the mobile device;

modify a signal strength threshold for a second transceiver associated with the gaming device from a first signal strength threshold associated with a first distance between the second transceiver and the mobile device to a second signal strength threshold associated with a second distance between the second transceiver and the mobile device, wherein the second distance is greater than the first distance;

determine that the second transceiver has received a remote connection request from the mobile device;

determine whether the remote connection request meets the second signal strength threshold;

determine whether the remote connection request comprises the token; and in response to determining that the remote connection request meets the second signal strength threshold and that the remote connection request comprises the token, cause the gaming device to allow the mobile device to provide remote input instructions to the gaming device.

18. The system of claim 17, wherein the machine-readable instructions of the memory further cause the processor circuit to, in response to determining that the remote connection request does not meet the second signal strength threshold, cause the gaming device to disallow the mobile device from providing the remote input instructions to the gaming device.

19. The system of claim 17, wherein the machine-readable instructions of the memory further cause the processor circuit to, in response to determining that the remote connection request does not comprise the token, cause the gaming device to disallow the mobile device from providing the remote input instructions to the gaming device.

20. A method comprising:

determining, by a processor circuit, that a first transceiver associated with a gaming device has received a validation request from a mobile device;

determining, by the processor circuit, based on the validation request, that the mobile device is authorized to provide remote input to the gaming device;

causing the first transceiver to transmit a token to the mobile device;

modifying a signal strength threshold for a second transceiver associated with the gaming device from a first signal strength threshold associated with a distance of less than one inch between the second transceiver and the mobile device to a second signal strength threshold associated with a distance of greater than six inches between the second transceiver and the mobile device;

determining, by the processor circuit, that the second transceiver has received a remote connection request from the mobile device;

determining, by the processor circuit, whether the remote connection request meets the second signal strength threshold;

determining, by the processor circuit, whether the remote connection request comprises the token; and in response to determining that the remote connection request meets the second signal strength threshold and that the remote connection request comprises the token, causing the gaming device to allow the mobile device to provide remote input instructions to the gaming device.

* * * * *